United States Patent
Shacham

(10) Patent No.: US 6,671,676 B1
(45) Date of Patent: Dec. 30, 2003

(54) METHOD AND APPARATUS FOR ANALYZING AND ALLOCATING RESOURCES OF TIME-VARYING VALUE USING RECURSIVE LOOKAHEAD

(75) Inventor: Nachum Shacham, Palo Alto, CA (US)

(73) Assignee: Metreo Markets, Inc., Palo Alto, CA (US)

( * ) Notice: Subject to any disclaimer, the term of this patent is extended or adjusted under 35 U.S.C. 154(b) by 0 days.

(21) Appl. No.: 09/565,573

(22) Filed: May 4, 2000

(51) Int. Cl.[7] ............................................... G06F 17/60
(52) U.S. Cl. ........................................................ 705/37
(58) Field of Search ..................... 705/24–40

(56) References Cited

U.S. PATENT DOCUMENTS

| | | | |
|---|---|---|---|
| 5,640,569 A | 6/1997 | Miller et al. | 395/729 |
| 5,794,207 A | 8/1998 | Walker et al. | 705/23 |
| 5,873,071 A | 2/1999 | Ferstenberg et al. | 705/37 |
| 5,897,620 A | 4/1999 | Walker et al. | 705/5 |
| 5,924,082 A | 7/1999 | Silverman et al. | |
| 6,021,398 A | 2/2000 | Ausubel | 705/37 |
| 6,035,289 A | 3/2000 | Chou et al. | 705/37 |
| 6,141,653 A | 10/2000 | Conklin et al. | |
| 6,338,050 B1 | 1/2002 | Conklin et al. | |
| 6,356,909 B1 | 3/2002 | Spencer | |

FOREIGN PATENT DOCUMENTS

| | | | | |
|---|---|---|---|---|
| EP | WO95/06918 | * | 3/1995 | G06F/157/00 |
| WO | 98US23462 | | 11/1998 | |
| WO | 99/17248 | | 4/1999 | |
| WO | 99/23595 | | 5/1999 | |
| WO | 99US17248 | | 7/1999 | |
| WO | 01/04723 A3 | | 1/2001 | |
| WO | 01/04723 A2 | | 1/2001 | |
| WO | 02/25544 A2 | | 3/2002 | |

OTHER PUBLICATIONS

"Emptoris Delivers The Power To Accomplish True Strategic Sourcing In Cyberspace," Emptoris—Press Release, May 15, 2000, http://www.emptoris.com/newsroom/pressreleases/news_press3_p.asp.

"Emptoris Files Patents For Its B2B E–Commerce Software," Emptoris—Press Release, Oct. 24, 2000, http://www.emptoris.com/newsroom/pressreleases/news_press15_p.asp.

"Emptoris Announces ePass Version 3.0 To Power Online Collaborative Strategic Sourcing," Emptoris—Press Release, May 21, 2001, http://www.emptoris.com/newsroom/pressreleases/news_press20_p.asp.

"Emptoris Delivers Significant ROI For Enterprise Customers," Emptoris—Press Release, Jul. 12, 2001, http://www.emptoris.com/newsroom/pressreleases/news_press24_p.asp.

(List continued on next page.)

*Primary Examiner*—Hyung Sough
*Assistant Examiner*—Thach H. Bui
(74) *Attorney, Agent, or Firm*—Townsend and Townsend and Crew LLP; Kenneth R. Allen

(57) ABSTRACT

A method and apparatus for continuously settling multi-sided competition for allocation of multi-attribute time-variable resources whose value that change over time or which expire if not allocated prior to a predetermined time, comprises applying a time-dependent cost optimization function to current and subsequent settlement periods. The invention is applicable to diverse fields, such as allocating professionals' time, competitive selling of perishable goods, allocating production capacity, and committing media space. The invention is useful in such fields as construction, information technology services, selling of perishable foods, production of electronic circuit boards, and selling of television advertisements.

35 Claims, 12 Drawing Sheets

OTHER PUBLICATIONS

"Emptoris Delivers Version 4.0 Of Its Sourcing Portfolio," Emptoris—Press Release, Nov. 5, 2002, http://www.emptoris.com/newsroom/pressreleases/news_press42_p.asp.

"The Emptoris Sourcing Portfolio Overview," Emptoris—Press Release, http://www.emptoris.com/solutions/overview_p.asp.

"Perfect Launches Advanced B2B Sourcing Solution—PerfectMarket," Emptoris—Press Release, Oct. 10, 2000, Perfect Commerce, Inc., http://www.perfect.com/news/pr_101000a.html.

"The Complete Strategic Sourcing & Enterprise Supply Management Solution," Emptoris—Press Release, Nov. 2002, Perfect Commerce, Inc., http://www.perfect.com.

"Perfect's B2B Sourcing Platform Includes Patent–Pending Intellectual Property Containing More Than 150 Unique Claims," Perfect Commerce, Inc., Emptoris—Press Release, Oct. 30, 2000, http://www.perfect.com/news/pr_103000b.html.

"Perfect Commerce Unveils Perfect Sourcing 3," Emptoris—Press Release, Jun. 4, 2001, Perfect Commerce, Inc., http://www.perfect.com/news/pr_060401.html.

"Perfect Commerce Releases Perfect Bid Manager V6, Extends Self–Serve Auction Leadership Position," Emptoris—Press Release, Nov. 4, 2002, Perfect Commerce, Inc., http://www.perfect.com/news/pr_110402.html.

"Perfect Commerce Launches Industry's First Enterprise Supply Management Software Suite," Emptoris—Press Release, May 6, 2002, Perfect Commerce, Inc., http://www.perfect.com/news/pr_050602.html.

* cited by examiner

Acquirer Properties
— 318

| ID | Certificate | Combination |
|---|---|---|
| 2840 | ABq54D | Any subset |
| — 311 | — 312 | — 313 |

| | Provider Offer | Mode | Provider | Offered price | Begin Time | End Time |
|---|---|---|---|---|---|---|
| Offer 1 | Any | 1 | Any | 300 | 7 | 9 |
| Offer 2 | 1346 | 2 | 1026 | 300 | 8 | 10 |
| Offer 3 | Any | 3 | 2323 or 3986 | 100 | 9 | 11 |
| — 319 | — 314 | — 315 | — 316 | — 317 | — 320 | — 321 |

Fig 7B

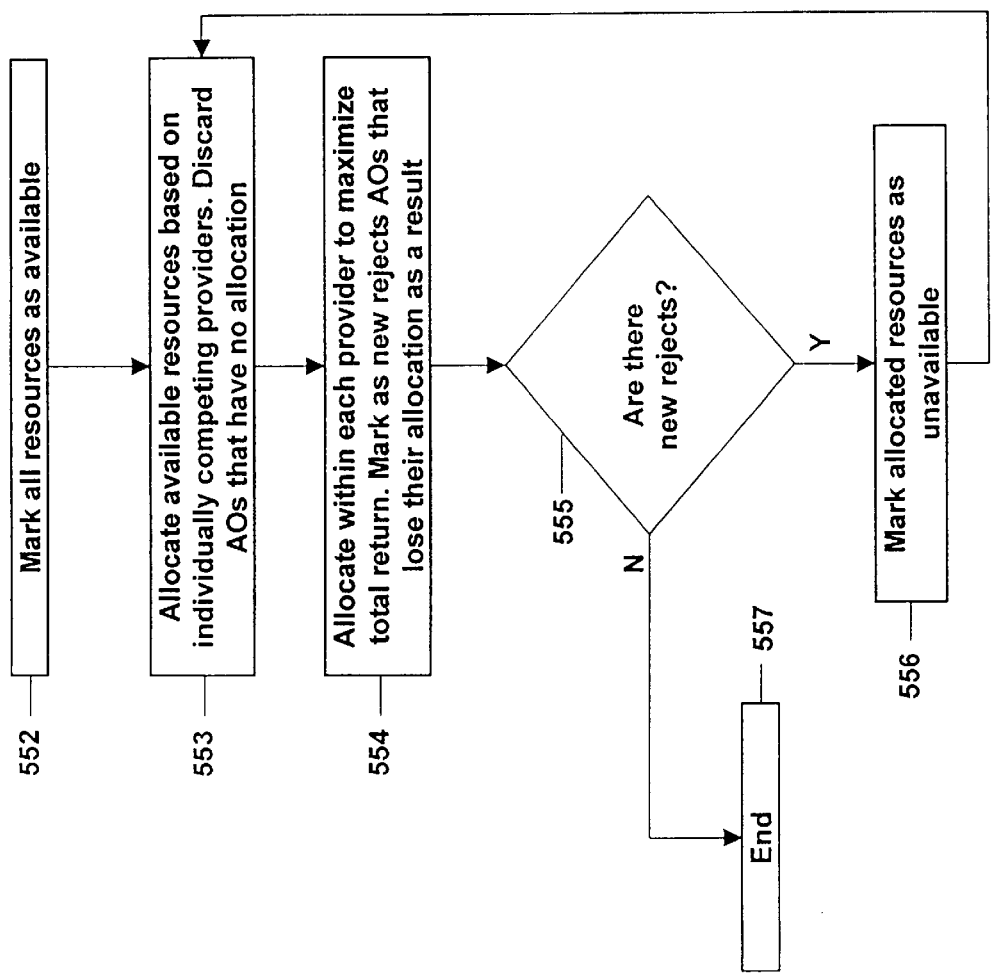

METHOD AND APPARATUS FOR ANALYZING AND ALLOCATING RESOURCES OF TIME-VARYING VALUE USING RECURSIVE LOOKAHEAD

The following patents were uncovered in a search for related technologies.

Miller et al., U.S. Pat. No. 5,640,569 issued Jun. 17, 1997 for DIVERSE GOODS ARBITRATION SYSTEM AND METHOD FOR ALLOCATING RESOURCES IN A DISTRIBUTED COMPUTER SYSTEM;

Chou et al., U.S. Pat. No. 6,035,289 issued Mar. 7, 2000 for METHOD AND APPARATUS FOR ELECTRONIC TRADING OF CARRIER CARGO CAPACITY;

Ausubel, U.S. Pat. No. 6,021,398 issued Feb. 1, 2000 for COMPUTER IMPLEMENTED METHODS AND APPARATUS FOR AUCTIONS;

Ferstenberg et al., U.S. Pat. No. 5,873,071 issued Feb. 16, 1999 for COMPUTER METHOD AND SYSTEM FOR INTERMEDIATED EXCHANGE OF COMMODITIES.

Other patents are known in the field of online sales, but those are believed to be less relevant to the present invention than the above titles.

E. M. Zoladz, WO 99/17248, Publication Date Apr. 8, 1999, OPTICAL SENSOR SYSTEM FOR A BILL VALIDATOR, Assignee: Mars Inc.

J. S. Walker, WO 99/23595, Publication Date May 14, 1999, CONDITIONAL PURCHASE OFFER (CPO) MANAGEMENT SYSTEM FOR COLLECTIBLES, Assignee: Priceline.com LLC.

Walker, J. S.; T. M. Sparico and T. S. Case, METHOD AND APPARATUS FOR THE SALE OF AIRLINE-SPECIFIED FLIGHT TICKETS, Assignee: Priceline.com Inc U.S. Pat. No. 5,897,620 issued Apr. 27, 1999.

J. S.; Walker, B. Schneier and J. A. Jorasch, METHOD AND APPARATUS FOR A CRYPTOGRAPHICALLY ASSISTED COMMERCIAL NETWORK SYSTEM DESIGNED TO FACILITATE BUYER-DRIVEN

BACKGROUND OF THE INVENTION

The present invention relates to a computer based system for continuous settlements of competition for allocation of time-varying resources whose values change over time on a scale comparable with the period of settlements. CONDITIONAL PURCHASE OFFERS, Assignee: Walker Asset Management LP; U.S. Pat. No. 5,794,207 issued Aug. 11, 1998.

SUMMARY OF THE INVENTION

According to the invention, a method and apparatus for continuously settling multi-sided competition for allocation of multi-attribute time-variable resources whose value changes over time, or which expire if not allocated prior to a predetermined time comprises applying a time-dependent cost optimization function to current and subsequent settlement periods. The invention is applicable to diverse fields, such as allocating professionals' time, competitive selling of perishable goods, allocating production capacity, and committing media space. The invention is useful in such fields as construction, information technology services, wholesale food, production of electronic circuit boards, and selling of television advertisements.

In the framework of this invention, resources are represented by offers to provide resources (called provider offers, PO), and requests for allocation of resources are represented by offers to acquire resources (acquire offers, AO). Providers and acquirers of resources initiate and submit POs and AOs, respectively.

The method includes mechanisms for efficient settlement of competition among AOs and POs that are presented over time. The mechanisms include (i) accumulation of arriving AOs and POs, (ii) running a series of settlements, also called arbitrations, where in each arbitration, multiple AOs and POs are considered concurrently and their matching and competitive constraints are analyzed. AOs are allocated POs whose matching deems most beneficial based on a predetermined utility function. Less competitive matchings of AOs and POs are not allocated. The mechanisms also include preemption of low priority allocations by high priority AOs that arrive subsequent to the settlement; roll over of AOs and POs that are not allocated to subsequent arbitrations; and a forward-looking assessment of the impact of current settlement allocations on future settlements to prevent allocation to inferior AOs from blocking resources for more lucrative future AOs. AOs and POs are allowed to change over time in order to improve their prospects of winning the competitive allocation and to adapt to time-dependent values of the prospective allocations.

In one embodiment, a central control system whose arbitrator subsystem executes the method, is connected by means of a communications network to providers and acquirers of resources. The providers and acquirers communicate to the arbitrator offerings to provide and acquire resources, POs and AOs, respectively. POs specify resource availability, characteristics of operation, and conditions under which the resources can be allocated. AOs specify the needs of their senders for particular services and the conditions under which allocation of resources is acceptable. The arbitrator stores received AOs and POs in a database and occasionally selects a subset of the AOs and POs, analyzes their compatibility, arbitrates their competition, and allocates resources to AOs.

Both AOs and POs are represented in the computer's database by multiattribute objects. An AO targets the allocation of a subset of resources within a specified range of parameter values, for example a time interval. AOs identify at different degrees of precision a plurality of resources acquire, and place conditions on the allocation of the resources, like price range and range of time at which allocation is acceptable. An example is when an AO identifies the task to be performed by the allocated resources and not necessarily the specific identity of the resources that perform the task.

A series of settlements arbitrates the competition among AOs and POs, where in each settlement the arbitrator selects a subset of the AOs and POs in the database, and concurrently associates multiple POs and AOs by matching their attributes. In each settlement the arbitrator identifies for each AO multiple POs that match the AO's attributes, making them candidates for allocation to that AO. Prior to the arbitration, acquirers and providers who submit AOs and POs, monitor their individual competitive positions, and modify one or more times their AOs and POs in order to adapt to time-varying value of the allocations and to improve their prospects of winning. At the beginning of the arbitration process, the arbitrator decides on the cost optimization function for allocation based on the competitive conditions, for example by considering whether the providers are competing or collaborating. The AOs and POs are selected for analysis based on this function. Also, the optimal allocation fairly arbitrates the competition among the AOs and the POs based on a cost optimization function. The output of a settlement is a list of allocations, i.e., AOs and the POs allocated to them, which the arbitrator communicates to the respective acquirers and providers. The list can include an exact match to the AOs, or a compilation of multiple alternatives.

Consecutive arbitration decisions are interdependent in that resources allocated in one settlement affect the POs and AOs that are available in subsequent arbitrations. AOs and POs arrive at the arbitrator at indeterminate times, so that when an arbitration is run, the prevailing conditions in subsequent arbitrations are not fully known. The method includes several provisions for optimizing the allocations over time. One provision is called look ahead, whereby the arbitrator ascertains the impact of the current allocation on subsequent ones. The arbitrator decides on an allocation in a specific settlement so as to minimize negative impact on future allocations. Another provision for optimizing resource allocation over time is called conditional acceptance, whereby the arbitrator allocates a resource to an AO first tentatively, and subject to subsequent preemption if future conditions yield more efficient allocation under such preemption. Another provision for optimizing resource allocation over time is called roll over, whereby the arbitrator retains AOs and POs that do not win allocation at a settlement, and considers them in subsequent settlements.

The invention will be better understood by reference to the following detailed description in conjunction with the accompanying drawings.

BRIEF DESCRIPTION OF THE DRAWINGS

FIG. 7B is a block diagram of a sample data structure for a goods or services acquirer, including an acquirer of the resource of FIG. 7A and a collection of offers to acquire and the time interval whereby they should be acquired.

FIG. 10 is a flow chart of a method for allocating multiple resources to multiple requests in the presence of competition among groups of collaborating resources in a free market model.

DESCRIPTION OF EMBODIMENTS

Figure 1:
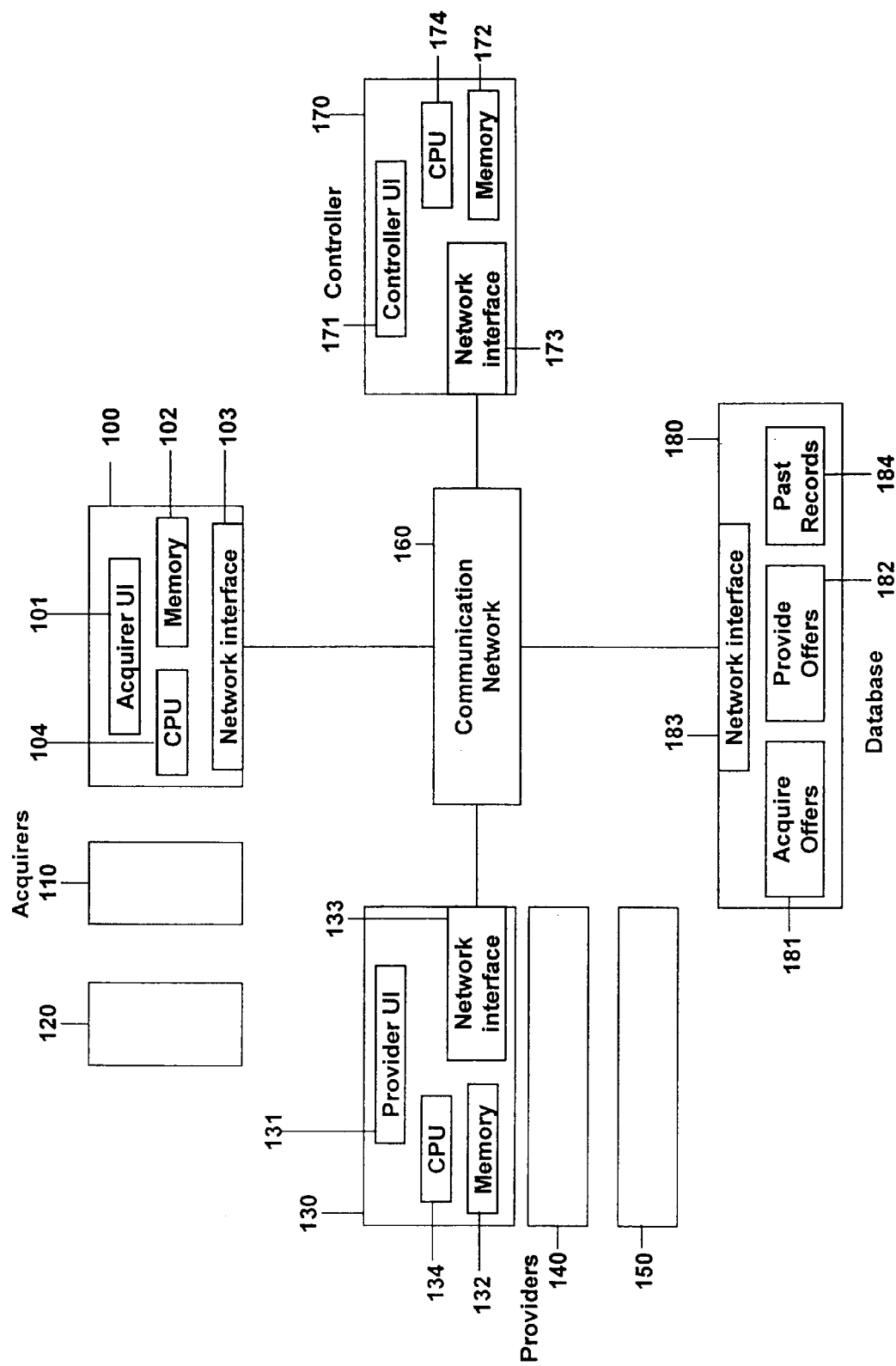
FIG. 1 is a block diagram of the structure of one embodiment of the invention.

FIG. 1 is a block diagram of one embodiment of the invention. The system includes a central control system 175, a plurality of providers, 130, 140, 150, a plurality of acquirers, 100, 110, 120, a database 180, and a communication system 160. Each provider generates offers to provide resources using the provider user interface (provider UI 131), CPU 134, and memory 132. Each provider sends provide-offers (PO) 182 through the provider's network interface 133 and the communication network 160. The POs 182 are stored in a database 180, which is connected to the communication network through network interface 183. Each of the acquirers 100, 110, 120 using their CPU 104 memory 102 and Acquirer UI 101, generates offers to acquire resources, called acquire offers (AO), and sends these AOs through their network interface 103 and the communication network 160 to the database 180, which stores them as acquire offers 181. The database 180 also stores profiles 184 of acquirers and providers, which can include records of past activities and background information. The arbitrator 170 runs the process of allocating PO 182 to AOs 181. The arbitrator runs the process through a program that is stored in its memory 172 and is executed in the CPU 174. The program execution is monitored through the Arbitrator UI 171. The communication network 160 can represent any system capable of providing the necessary communications and includes for example a local or wide area network such as for example Ethernet, a telephone system, a data network like ATM or frame relay, the internet, or the world wide web. The arbitrator 170 uses the network interface 173 as the output device for computation results. A provider 130 and acquirer 100 use respective provider UI 131 and acquirer UI 101 as output devices.

In one embodiment, the central control system, providers, and acquirers are personal computers or workstations. The database 180 is a persistent storage of the central control system.

Figure 2:
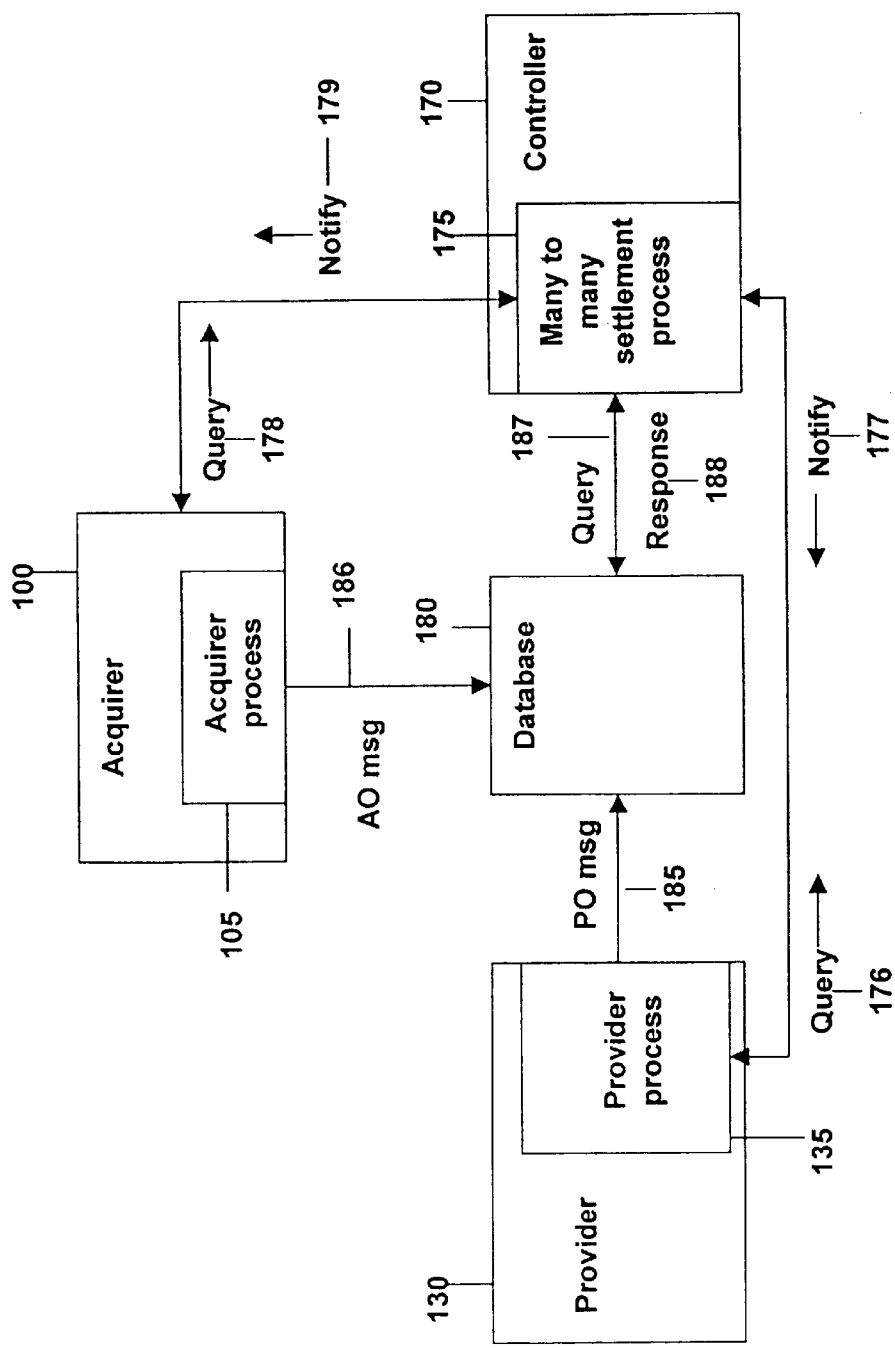
FIG. 2 is a block diagram of logical elements of one embodiment of the invention.

FIG. 2 is a functional block diagram illustrating the main processes that are carried out to implement the allocation of time-varying resources of the present invention. An acquirer implements the acquirer process 105, which generates AO message 186 and sends them to the database 180. The AO message 186 can represent a new offer, in which case it is added to the database 180; a modification of an existing AO issued by the same acquirer, in which case the corresponding record in the database is updated; or a withdrawal of a previously submitted offer. The acquirer process 105 issues query messages 178 to the arbitrator 170, requesting a notification of the standing of the particular AO with respect to competing offers. The arbitrator sends to the acquirer process notify messages 179, which include the relative standing of the AO in the competitive multi-targeted acquisition to which the settlement is applied. Following the settlement, the notify message 179 includes the PO that the acquirer is eligible or liable to acquire. The provider process 135 issues PO messages 185, which are added to the database 180 if they are new, or update existing records if they are modifications to previous PO messages 185 by the same provider process 135. The provider process 135 issues query messages 176 to the arbitrator, whereby the provider process requests status of the competition related to its own POs that are included in the present settlement 175. The arbitrator sends notify messages 177 to the provider process 135, containing the current status of competition before the settlement, and a list of AOs that are eligible or liable to acquire each PO, after the settlement. The many-to-many settlement process 175 issues query messages 187 to the database 180, which responds with response messages 188. Response messages contain information regarding AOs and POs currently in the database and information regarding past records 184.

Figure 3:
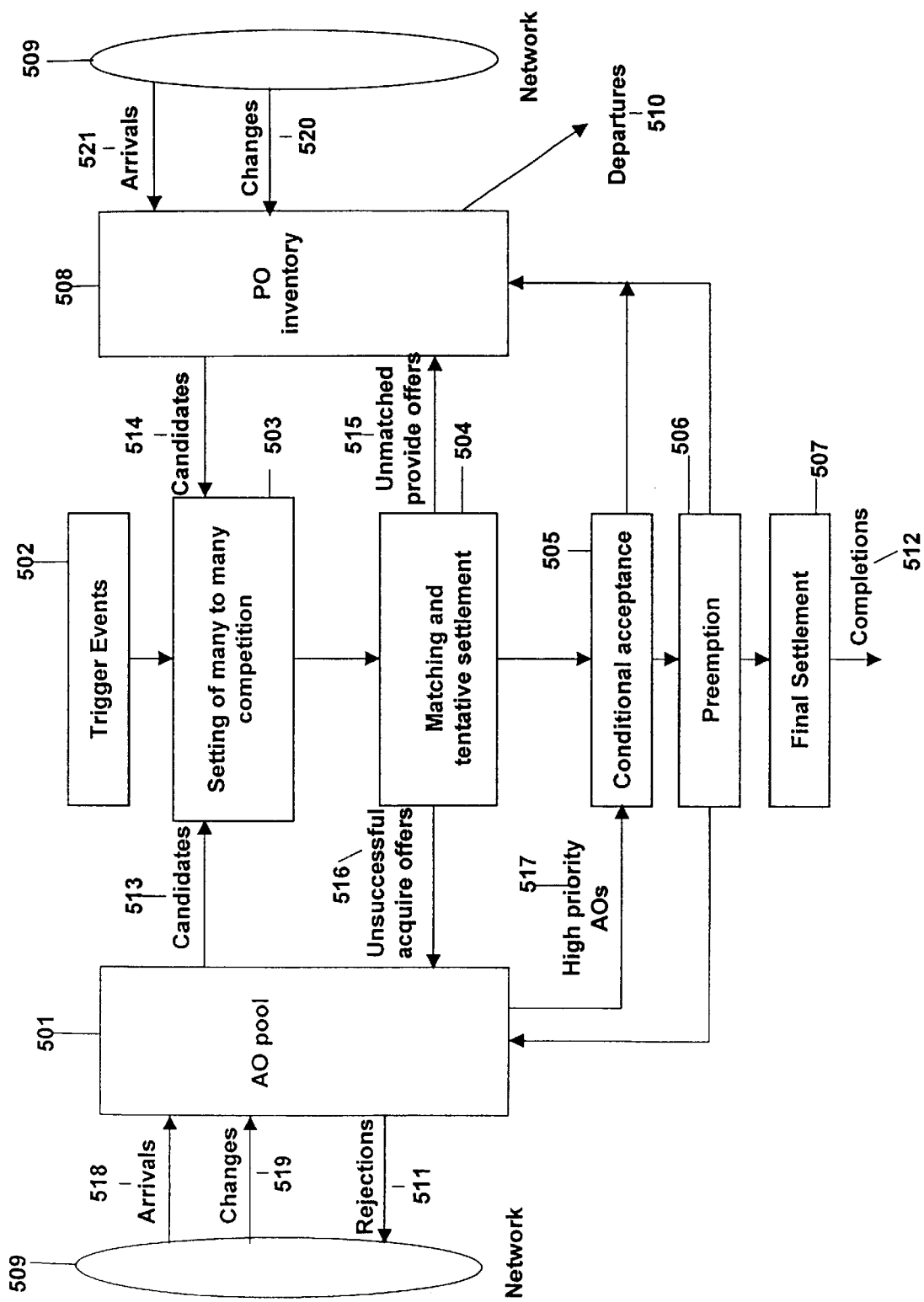
FIG. 3 is a flow chart of a process according to the invention.

FIG. 3 shows the stages of the settlement process for arbitration of competition for allocation of multiple time-varying resources. Arriving POs 521 and arriving AOs 518 are held at the PO inventory 508 and AO pool 501, respectively. Both AOs and POs can change over time. AO changes 519 affect their relative standing in the competition and their ability to match with POs. Changes to POs 520 affect their value to AOs and their availability. AOs and POs can be changed by a plurality of causes including acquirers and providers who send update messages for their respective offers, and the arbitrator, which changes the values as a function of time and the AOs and the POs in the database. Such changes reflect the time-dependent values of the resources to the providers and to the AOs.

Upon the arrival of an AO, its priority is determined. High-priority AOs 517 are processed immediately and the arbitrator finds matching POs for each arrival. Other AOs are kept in the AO pool 501 until they are selected for processing as candidates 513 for matching with POs.

Triggering events 502, which specify the conditions under which settlement processing is initiated over time. A triggering event 502 causes the arbitrator to begin the process of matching AOs with POs, where a matching implies an allocation of POs to AOs. Triggering events 502 include specific time instances at which settlement begins. For example, the arrival of a high-priority AO triggers the matching process, as do changes in availability of resources and the expiration of a timer set to expire at a predetermined time. When the arbitrator recognizes a triggering event 502, it begins a settlement process. The settlement process targets a sliding period for which the allocation is applied. Sliding periods can take different forms including a time interval, which can be uniform or different in duration for all resources. Sliding periods can also be defined as future instances in which resources are available.

In the first step 503 of the settlement, the arbitrator sets the conditions for the competition, including selecting the cost optimization function, selecting the AOs 513 and POs 514 that participate in the arbitration, and establishing the relationships between AOs and POs. In this stage 503 the arbitrator selects at least one AO 513 from the AO pool 501 and at least one PO 514 from the PO inventory 508, as candidates for matching. The selection of candidates 503 is based on criteria that includes the target sliding period for the allocation, the multiple attributes of the AO and the PO, the type of triggering event 502, the allocation price range, and the profiles saved in the database.

The arbitrator attempts to create relationships between each of the selected AO candidates with a plurality of POs, which is the set of POs that can be allocated to that AO. The attributes of the AOs identify—at different levels of specificity—the POs they target for allocation and the conditions for such allocation. At the selection stage 503, each AO is evaluated based on the ability to satisfy its allocation constraints. An AO becomes a candidate in a settlement only if its constraints can be satisfied in the current settlement process. For example, if the settlement targets allocation for a time period between 1 pm and 2 pm, an AO that seeks allocation beginning at 4 pm is not elected as a candidate for that particular settlement.

In the setting stage of many-to-many competition 503 the arbitrator creates relationships between each candidate AO and multiple POs that can satisfy the requirements set by the AO. The arbitrator assigns to each relationship priority values, which are used to set the order by which POs are probed for that AO for possible allocation. The priority values are used for determining the AOs that win the competition and are entitled to have the PO allocated to them. The process of determining the PO allocations to AOs is called matching. Matching is performed according to a cost optimization function. Examples of cost optimization functions include maximizing the total value of all values selected in an allocation, maximizing the individual value to each resource, and maximizing the total value of all selected values over time.

Candidate AOs that are not included in the matching are returned 516 to the AO pool 501 to be evaluated at subsequent settlements. AOs that can no longer be candidates at future settlements are rejected 511 from the AO pool. POs that are not acquired in the current allocation 515 are returned to the resource inventory 508 for allocation at subsequent settlements. POs that pass their expiration time are discarded and depart 510 from the PO inventory 508. Following a matching, the impact of its results on future availability is evaluated. The results of the matching are modified if the largest availability of the resources is needed for subsequent settlements.

The arbitrator can define some of the allocation as tentative 504, which results in conditional acceptance 505 of some of the allocations of the POs. Those allocations that are under conditional acceptance 505 are subject to future changes if high priority AOs 517 arrive and make it beneficial to preempt them 506. Preempted AOs are returned to the AO pool 501 to be evaluated in a subsequent settlement. The allocation of POs to AOs that are not preempted become permanent and unchangeable 512. Following the preemption the allocation assume the status of a final settlement 507, causing respective AOs and POs to leave the system, marked as completions 512.

Figure 4:
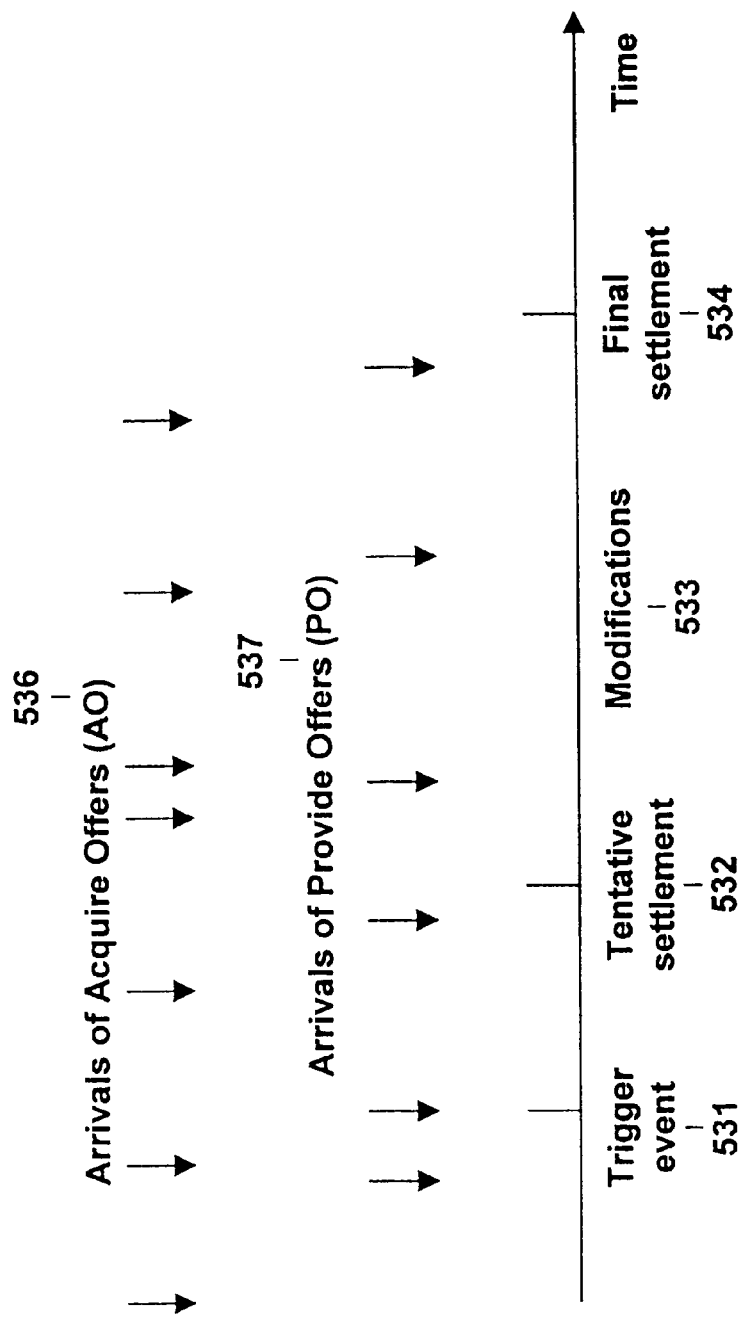
FIG. 4 is a timing diagram illustrating the environment and the timing relationship between events in the environment.

FIG. 4 is a timing diagram of events. AOs 536 and POs 537 arrive at indeterminate times. A triggering event 531 signals the beginning of a settlement at which point AOs and POs pertinent to that settlement are selected for competitive allocation, and the cost optimization function for the allocation is determined according to the competitive environment. A tentative settlement 532 is determined first. In some, the allocations of POs to AOs are conditional and subject to future preemption. AOs and POs that arrive subsequent to the tentative settlement during the modification period 533 can cause the allocation to be modified by preempting existing allocations of POs and AOs. A final settlement 534 terminates the modification period, and then the allocations are communicated to the acquirers and providers.

Figure 5:
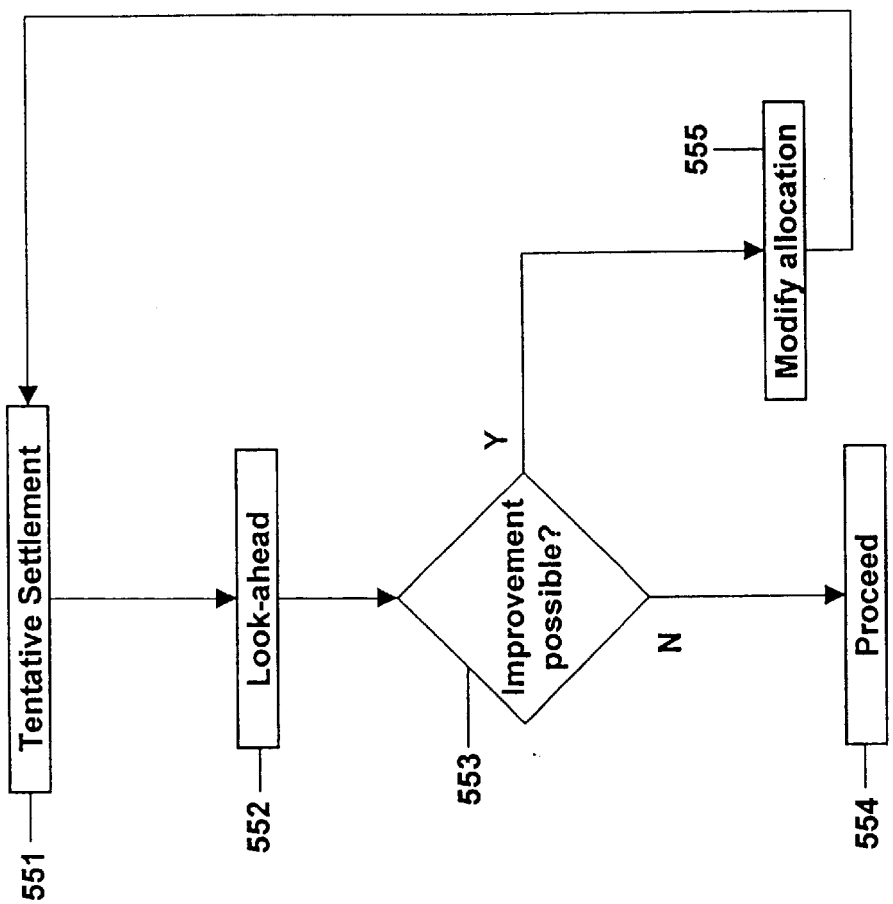
FIG. 5 is a flow chart of a process of continuous settlements.

FIG. 5 is a flow chart of the general process of look ahead. The arbitrator targets the allocation of resources at a specific sliding period 551. However, an arbitration that starts at this period can result in an allocation of resources over an extended period that lasts beyond the specific sliding period and affects subsequent settlements. The arbitrator determines the duration of the extended period 552 and ascertains the impact of the present allocation on the allocations in the extended period. If the arbitrator finds that an improvement to subsequent allocations is possible (Test step 553), the arbitrator modifies the allocation (Step 555) of the current settlement, blocks the resources that are needed for the subsequent allocation (Step 555), and repeats the current arbitration using the modified resources 551. Otherwise, the arbitrator proceeds to the next step in the settlement (Step 554).

Figure 6:
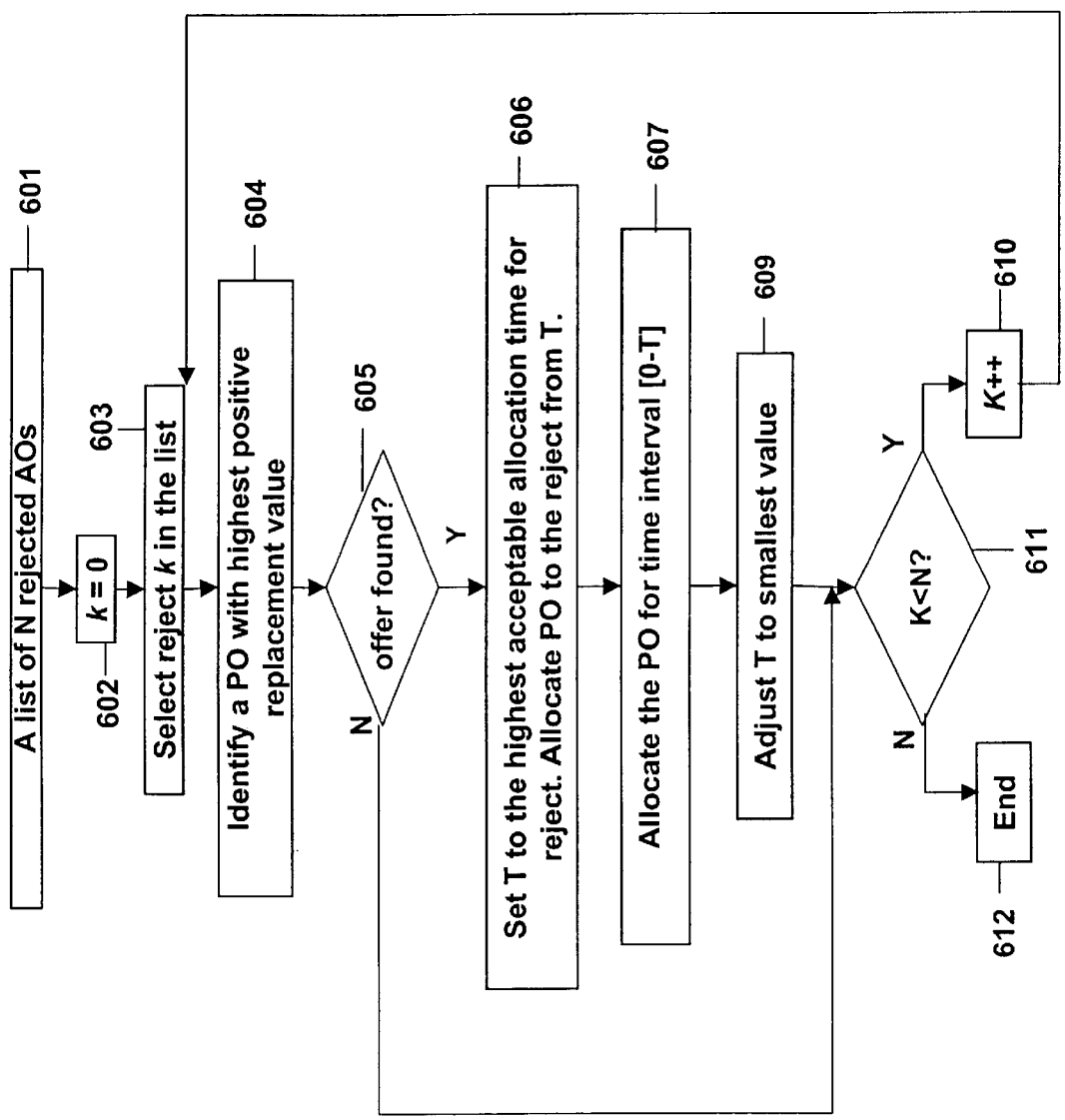
FIG. 6 is a flow chart of a process involving look ahead according to the invention.

FIG. 6 is a flow chart of one embodiment of the look ahead process together with the look ahead test and the modification step (Steps 552, 553, 555). The input to the process is a list of rejected AOs, which are those targeted for subsequent settlements within the extended period but have had all their target resources allocated in the current settlements 601. The rejected AOs are sorted by their replacement value, which is the difference in value if they were to replace existing allocations, the process begins by setting the index k to the value of 0, which by convention implies it is the index of the AO with the highest replacement value (Step 602). The arbitrator selects the rejected offer with index k (Step 603) and attempts to identify an allocated AO for which the examined AO has the highest replacement value (Step 604). If no such offer is found (Test step 605) the process continues to select the next rejected AO 603. Otherwise, the reject is allocated the resource represented by the PO starting at the greatest time value possible T (Step 606). The arbitrator attempts to allocate the resource at time interval [O-T] (Step 607) and then adjusts the allocation time of the reject to the shortest possible value in the interval [O-T] (Step 609). If the reject list is not exhausted (Test step 611), the arbitrator increments the index of the reject list (Step 610) and repeats (Step 603). Otherwise the process terminates (Step 612).

Figure 7A:
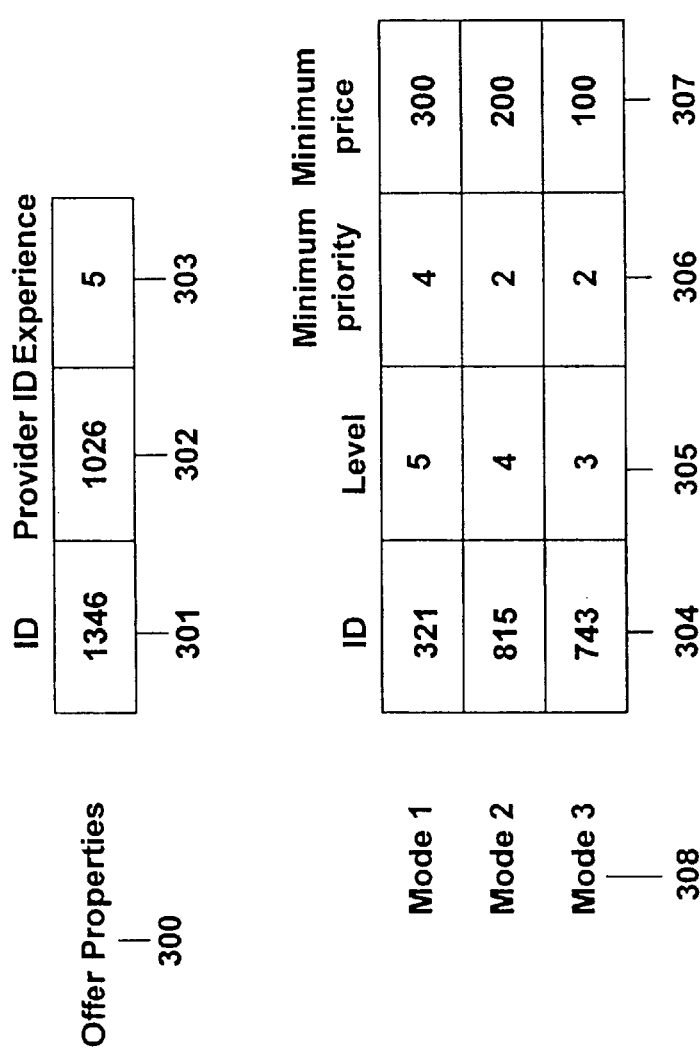
FIG. 7A is a block diagram of a sample data structure for a goods or services provider including resource and mode of operation of the resource.

FIG. 7A is a diagram of a data structure representing a PO in an embodiment that addresses the labor market, in which case the resource is a professional person. This embodiment can be modified in a straightforward manner to other domains including, but not limited to, production capacity, media space, cargo space, or other allocations of a scarce, time-dependent, even perishable resource. In FIG. 7A the PO contains multi-attribute data that describes the resource as a whole, or describes the offer properties 300, such as the identification of the resource 301, the identification of the provider 302, and the level of experience 303. The PO also contains multi-attribute data for each mode 308 in which the resource can operate. In the labor market embodiment, the mode can represent a type of skill that the resource has, or a task that the resource can perform. The mode contains the fields identification 304, level 305, minimum priority 306, and minimum price 307. The number of data fields and their semantics are not restricted. Different embodiments can also have a different number of fields in different modes.

FIG. 7B is a data structure representing an AO 318 containing multi-attribute data that describes the characteristics of the AO as a whole and the resources targeted by this AO. The data fields that describe the AO as a whole include the acquirer's identification 311, an electronic authenticity certificate 312, and the combination of resources 313 that are acceptable by the acquirer. The value "any subset" for example, implies that the acquirer is willing to accept any part or all of the requested resources. The AO includes multi-attribute data for each individual offer 319 in the AO. The attributes in each offer 319 include the identification of a provider offer 314, the mode in which the PO will be accepted 315, the identification of a particular provider or any provider 316, and the price offered for the allocation 317. The time interval for which the AO targets its request is specified begin time 320 and end time 321.

Figure 8:
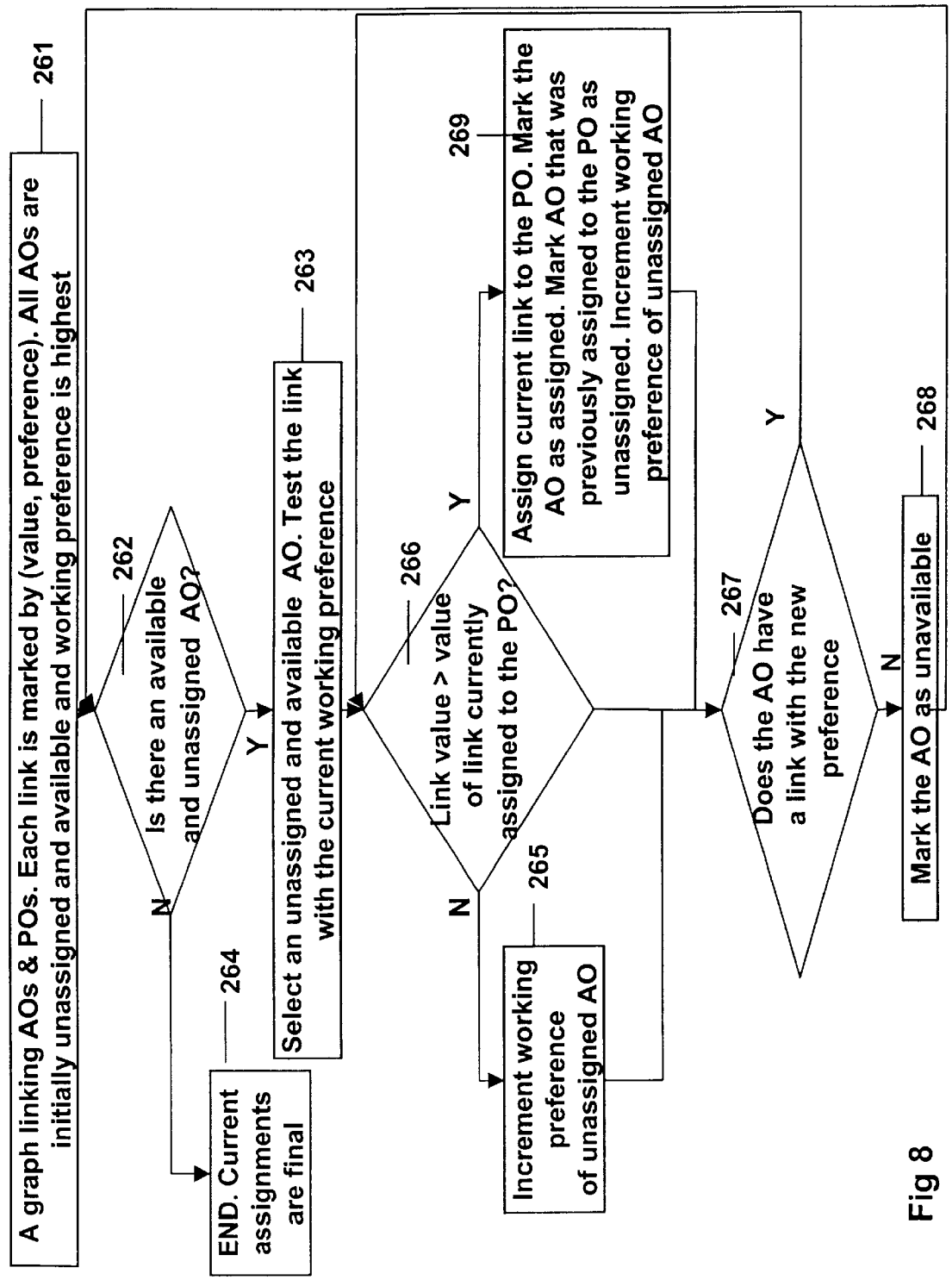
FIG. 8 is a flow chart of a method for allocating multiple resources to multiple requests in a true free market model.

FIG. 8 is a flow chart of the process by which the controller assigns POs to AOs in an environment where multiple competing providers submit a PO, and strive to be allocated to the AOs with matching values. The database contains a plurality of AOs competing for an allocation of POs. The input to the process consists of lists of AOs and POs that are candidates for matching, and a graph connecting AOs to potential POs. Each link in the graph represents a relationship, which has a value and a preference. The preference indicates the order by which an AO prefers POs to be allocated to it 261. These values are derived from the priority values assigned to each relationship. The value of each link is determined by the priority values of the corresponding relationship, the attributes of the AO and the PO. All links from an AO to candidate POs have different preferences values, which are represented as contiguous integers beginning with 0 (highest preference) and ending at the total number of links from that particular AO.

The arbitrator performs the process by scanning iteratively all the AOs in the list of candidates. Initially, all AOs are available and unassigned and all AOs have a variable that is called current working preference, which is set to 0. Initially, all POs have value 0 and have no AO assigned to them. A typical step begins by the controller checking whether there is still an AO in the list that is not yet assigned 262. If there is none, the process ends and the list of assigned AOs represents the final allocation 264. If there is an AO that is available and unassigned, the controller selects one of the list and examines the PO that is connected to the link with the highest working preferences 263. If that PO has a value that is larger than the link, the current working preference of the AO is incremented 265. Otherwise, the AO is assigned to the PO using the current link. The AO is marked as assigned. The AO that was previously assigned to the PO is marked unassigned and its current working preference is incremented 269. The controller proceeds to examine the unassigned AO if one survives steps 265 and 269. If the assigned AO has a link that corresponds to the new current working preference, the controller considers that link by going to step 266. Otherwise the AO is marked unavailable 268 and the process repeats step 262.

Figure 9A:
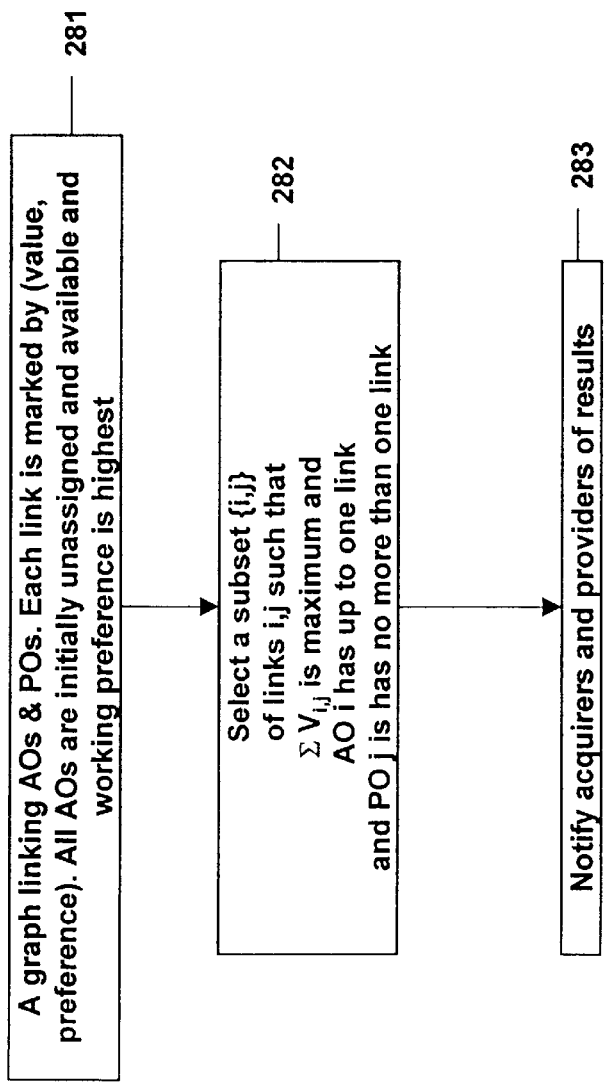
FIG. 9A is a flow chart of a method for allocating multiple resources to multiple requests in a collaborative provider model.

FIG. 9A is a flow chart of the process by which the arbitrator assigns POs to AOs in an environment where a single provider offers a plurality of POs with the objective of maximizing the total value of all allocated POs, and each PO can be allocated to no more than one AO and each AO seeks to acquire at most one PO. The database contains a plurality of AOs competing for allocation of POs 281. The input to the process consists of lists of AOs and POs that are candidates for matching, and a graph connecting AOs to potential POs. Each link in the graph has a value assigned to it and a preference value, which indicates the order by which an AO prefers POs to be allocated to it 281. From the AOs and POs in the graph, the arbitrator select a subset of AOs and POs such that the sum of the value of the connecting links is maximized, and such that no AO has more than one link selected and no PO has more than one link selected 282. An example for an algorithm for selecting the subset is maximum weighted matching. After determining the set of links that maximizes the total value, the arbitrator proceeds to communicate the results to the acquirers and providers 283.

Figure 9B:
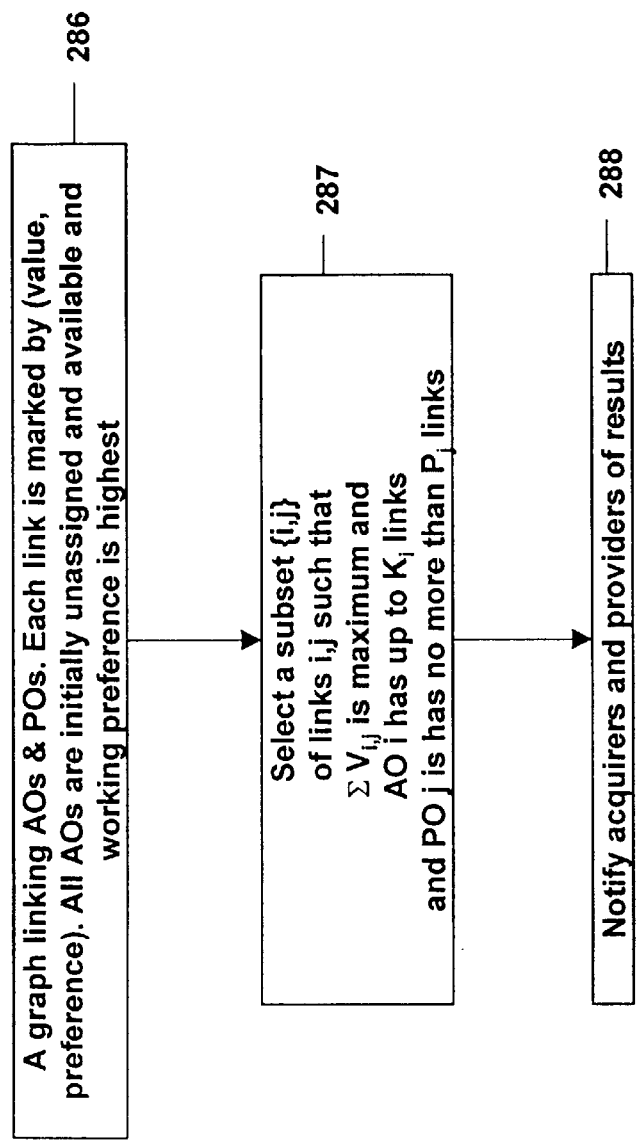
FIG. 9B is a flow chart of a method for allocating multiple resources to multiple requests in a collaborative provider model where each resource is allocated in parts to a plurality of requests.

FIG. 9B is a flow chart of the process by which the arbitrator assigns POs to AOs in an environment where a single provider offers a plurality of POs with the objective of maximizing the total value of all allocated POs, and $PO_j$ can be allocated to no more than $P_i$ AOs, and each AO seeks to acquire at most $K_j$ POs. The database contains a plurality of AOs competing for allocation of POs. The input to process consists of lists of AOs and POs that are candidates for matching, and a graph connecting AOs to potential POs 286. Each link in the graph has a value assigned to it and a preference value, which indicates the order by which an AO prefers POs to be allocated to it 281.

From the AOs and POs in the graph, the arbitrator selects a subset of AOs and POs such that the sum of the value of the connecting links is maximum, and such that no AO has more than $K_i$ links selected and no PO has more than $P_i$ links selected 287. An example for an algorithm for selecting the subset is maximum weighted matching with multiple assignments. After determining the set of links that maximizes the total value, the arbitrator proceeds to communicate the results to the acquirers and providers 288.

FIG. 10 is a flowchart of the process of arbitration when there is a plurality of providers, each offering multiple Pos. The objective of the providers is to maximize their individual total value of the AOs to which their POs are allocated. The objective of the acquirers is to get an allocation of the PO with the highest preference possible under the competition. The arbitration process begins with a step in which the arbitrator marks all resources as available 552, following which it allocates resources to maximize individual values, for example according to the procedure outlined in FIG. 8, and discards all AOs that are not allocated any PO 553. The arbitrator rearranges the allocation for each provider to match the objectives of each individual provider 554. For example, by using the procedure in FIG. 9A to maximize the sum of the values for all POs for each individual provider. AOs that lose their allocation in step 554 are designated as rejects. If there are new rejects generated 555, the resources allocated in this round are marked unavailable 556 and the process begins a new rounds. Otherwise, the process ends 557.

The invention has been explained with reference to specific embodiments. Other embodiments will be evident to those of ordinary skill in the art. It is therefore not intended that this invention be limited, except as indicated by the appended claim.

What is claimed is:

1. In a data management system, a method for matching at least one of many resources with at least one of many requests for time-variable resources in the presence of a plurality of offers of resources and a plurality of requests for resources, wherein it is initially assumed that many providers of said time-variable resources exist, said method comprising:
   a) initiating a sliding period for offering and requesting upon notification to said providers and to acquirers, said acquirers being sources of said requests;
   b) providing, to an arbritator, a plurality of withdrawable offers of specific time-variable resources to be acquired during time intervals;
   c) providing, to said arbitrator, a plurality of withdrawable requests for said specific resources;
   d) upon a triggering event, terminating said sliding period for offering and requesting;
   e) causing said arbitrator to create relationships among surviving offers of resources and surviving requests for said time-variable resources;
   f) causing said arbitrator to apply a time-dependent cost minimization function to each one of said relationships in order to optimize matches between said offers with specific time-variable resources; then
   g) outputting a settlement indication to each affected acquirer and to each affected corresponding provider upon a determination that a best match has been achieved for closure; but in the event of failure of closure
   h) repeating steps a) through f) for a subsequent sliding period.

2. The method according to claim 1 wherein said time-dependent optimization includes look ahead for estimating value of said time-variable resources during at least a first said subsequent sliding period.

3. The method according to claim 2 for wherein said time-dependent optimization further includes look ahead for estimating value of said time-variable resources during all said subsequent sliding periods during which said time-variable resources have non-zero value.

4. The method according to claim 2 wherein said look ahead includes feedback for correcting current best match.

5. The method according to claim 1 wherein said offers have time-dependent value.

6. The method according to claim 1 wherein said offers include a time-dependent utility priority weight.

7. The method according to claim 1 wherein said resources include a time-dependent utility priority weight.

8. The method according to claim 1 wherein said closure is a commitment to an exchange prior to settlement.

9. The method according to claim 1 wherein said closure is a recommendation to accept an exchange after settlement.

10. The method according to claim 1 wherein the sliding period is a time interval.

11. The method according to claim 1 wherein the sliding period is a uniform time interval for all surviving resources.

12. The method according to claim 1 wherein the sliding period is the next available interval for each resource.

13. The method according to claim 1 wherein the sliding period is an arbitrary available interval for each resource.

14. The method according to claim 1 wherein the allocation of the resource is for fixed duration.

15. The method according to claim 1 wherein the allocation of resources is for a variable length interval with a pre-determined duration.

16. The method according to claim 1 wherein the allocation of resources is for a variable length interval until the requestor disengages from the resource.

17. The method according to claim 1 wherein the resources are represented by a vector of at least one attribute.

18. The method according to claim 17 wherein the offers are represented by vectors of at least one attribute.

19. The method according to claim 18 wherein said attributes change over time.

20. The method according to claim 19 wherein the change in attributes is a function of time.

21. The method according to claim 19 wherein the change in attributes is a function of external data that becomes available to said arbitrator.

22. The method according to claim 1 wherein changes in attributes are presented to different users in accordance with a profile for said user.

23. The method according to claim 1 wherein changes in attributes are presented to different users in accordance with an arbitrary index.

24. The method according to claim 1 wherein offers that do not gain allocation are considered in subsequent settlements.

25. The method according to claim 1 wherein the optimization function is determined subsequent to the closing.

26. The method according to claim 1 wherein the optimization function for competing providers is a cost minimization function for a competitive environment.

27. The method according to claim 1 wherein the optimization function for collaborating providers is a cost minimization function for a collaborative environment.

28. The method according to claim 1 wherein resources are committed firmly or conditionally, where conditional commitment allows subsequent offers to preempt the commitment.

29. The method according to claim 1 wherein requests for resources identify target resources precisely.

30. The method according to claim 1 wherein requests for resources identify target resources by set.

31. The method according to claim 1 wherein said arbitrator identifies target resources on behalf of the requests.

32. The method according to claim 1 wherein said requests for resources comprise requests for total supply of said resources.

33. The method according to claim 1 wherein said requests for resources comprise requests for partial supply of said resources.

34. The method according to claim 1 wherein said arbitrator provides a report on individual competitive position of a source of the request prior to the settlement, said report being tailored to a profile about the request.

35. An apparatus for matching at least one of many time-variable resources with at least one of many requests for time-variable resources in the presence of a plurality of offers of time-variable resources and a plurality of requests for time-variable resources, wherein it is initially assumed that many providers of said time-variable resources exist, said apparatus comprising:

a communication system interconnecting a plurality of providers of time-variable resources and acquirers of time-variable resources;

a central control system including an arbitrator subsystem for controlling timing of communications, for administering a sliding period for said requests and said offers, and for processing computations relating to assignments and to arbitration of priority values relating to a plurality of withdrawable offers of specific time-variable resources a nd to a plurality of withdrawable requests for said specific time-variable resources, wherein said arbitrating subsystem is operative to create relationships among surviving requests and surviving resources, said relationships constituting candidates for matching, to assign to each said relationship a plurality of priority values, to evaluate collectively all relationships based on assigned priority values, and to apply a tailored time-dependent cost optimization function to each one of said relationships in order to optimize matches between said requests with specific ones of said resources, wherein said tailored time-dependent cost minimization functions are different for different types of competition among providers of resources; and an output system for outputting an indication of successful arbitration to each said source of requests for time-variable resources and to each said provider of said time variable resources which corresponds to each said source upon a determination that a best match has been achieved for closure.

* * * * *